UNITED STATES PATENT OFFICE.

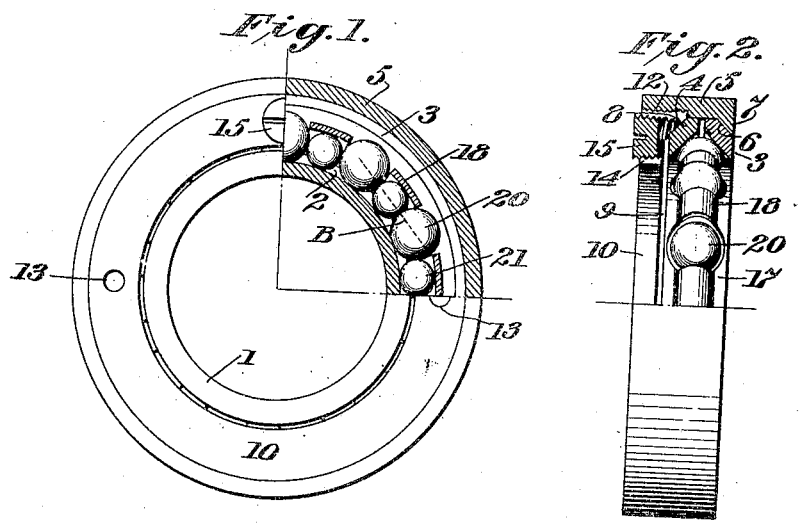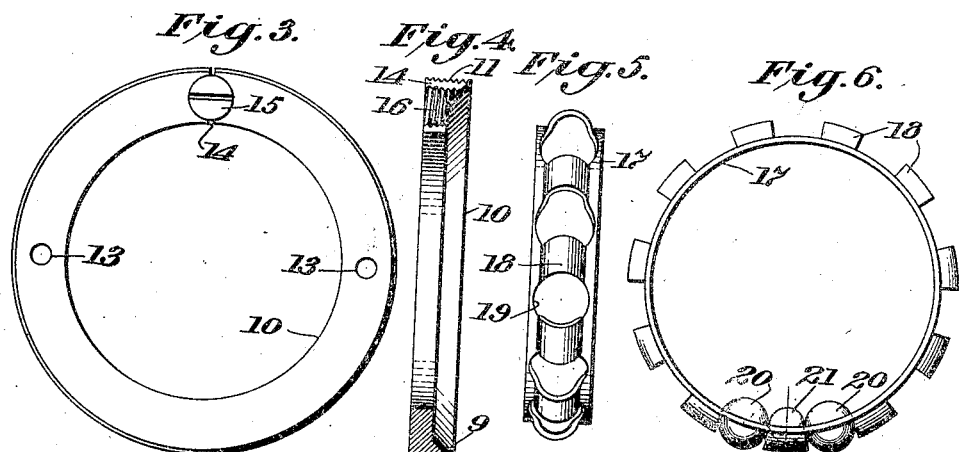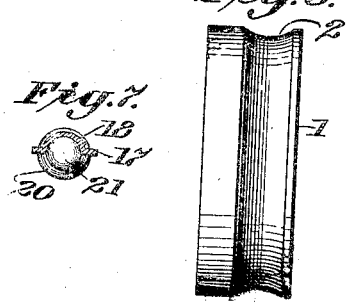

CHARLES H. CHAPMAN, OF WINCHESTER, MASSACHUSETTS.

BALL-BEARING.

1,204,938.          Specification of Letters Patent.          Patented Nov. 14, 1916.

Original application filed September 15, 1914, Serial No. 861,814. Divided and this application filed November 26, 1915. Serial No. 63,466.

*To all whom it may concern:*

Be it known that I, CHARLES H. CHAPMAN, a citizen of the United States, residing at Winchester, in the county of Middlesex and State of Massachusetts, have invented a certain new and useful Improvement in Ball-Bearings, of which the following is a full, clear, and exact description.

The object of this invention is to provide a simple, compact and efficient ball bearing, adapted to receive a ball retainer of novel and simple construction, by which the balls are maintained in desired position in relation to each other.

The present invention is divided out of my case Serial No. 861,814, filed September 15, 1914, now Patent No. 1,163,212, dated December 7, 1915, and the present invention consists of the ball retainer explained in said case, as I will proceed now to set forth and finally claim.

In the accompanying drawings illustrating the invention, in the several figures of which like parts are similarly designated, Figure 1 is a front elevation, and quarter section, and Fig. 2 is an edge elevation and similar section, illustrating the complete bearing. Fig. 3 is a front elevation, and Fig. 4 is a vertical section of the locking ring detached. Fig. 5 is an edge view of the ball retainer without the balls; Fig. 6 is a front elevation thereof with two load-carrying balls and one idler ball in position, and Fig. 7 is a cross-section taken substantially in the plane of line A of Fig. 6. Fig. 8 is an edge elevation of the cone.

As in the parent case hereinabove referred to, so here, 1 is a cone, so-called, which forms the inner or central bearing member. This cone is in the form of a ring, and has the circumferential groove 2 in which the balls run. The outer member of the bearing is composed of a stationary annular cup 3 and an adjustable annular cup 4, and an inclosing housing 5. The cups 3 and 4 have their inner faces beveled or otherwise prepared to form an outer groove for the balls complementary to the groove 2 in the cone 1. The cup 3 is constructed in any suitable way to fit in the housing 5, and for this purpose, as herein shown, the back of the cup is beveled at 6 to engage a correspondingly beveled flange 7 at the back of the housing. The adjustable member 4 likewise is arranged so as to be accurately adjusted within the housing and toward the stationary cup 3 in order to afford the proper raceway for the bearing balls; and the back 8 of this adjustable cup may be constructed in any suitable way to receive pressure from a fixing medium. As herein shown, the back 8 of the cup 4 is beveled, and this beveled portion is engaged by the complementary beveled portion 9 on the locking ring 10, and this locking ring is provided with an external circumferential screwthread 11 by means of which it may be screwed into the internally screwthreaded rim 12 of the housing 5. For the purpose of screwing the locking ring 10 into and out of the housing, it may have holes 13 in its face to receive a spanner wrench. In order to fix the locking ring in position so as to fix the adjustment given to the adjustable cup, this ring is split at 14, as shown in Figs. 2, 3 and 4, and by means of this split the ring is capable of being expanded within the housing and held in such expanded position with sufficient force to prevent its running out of the housing accidentally. A convenient and efficient expanding medium is the tapered screw 15 fitted in correspondingly threaded recesses 16 in the opposite ends of the ring 10 adjacent to the split 14 therein, so that by turning this screw into the ring, the ring may be expanded within the housing, and so held in adjusted position. When it is desired to readjust the adjustable cup, the screw may be loosened or run out, thereby releasing the locking ring and permitting it to be turned to a new adjustment or entirely removed.

The ball retainer 17 is of ring form, and its periphery is provided with a series of alined or concavo-convex projections 18, and intermediate openings 19. As shown in Fig. 7, these projections 18 constitute practically a periodically interrupted groove. This ball retainer is made preferably as a continuous instead of as a sectional ring, but otherwise is substantially like what is shown in my case Serial No. 813,971, filed January 23, 1914. The openings 19 receive the load-carrying balls 20 which are thereby flanked at opposite points by the projections 18, and these projections receive the idler balls 21, and all of these balls run in the groove 2 of the cone 1.

With the center of the idler ball at or near a line drawn through the center of the two adjacent load-carrying balls which it separates, as shown by dotted line B in Fig. 1, and the arrangement of the load-carrying balls with the center or axis of the idler ball at or near what I term the dead center line of the load-carrying balls, the tendency of the idler ball to fly out from between the load-carrying balls when pressed against by the load-carrying balls, is very slight.

The idler balls maintain the ball-retainer at all times concentric with the ball-race, and thereby overcome the cross friction of the load-carrying balls, which would occur were the load-carrying balls allowed to run with the surfaces crossing each other in opposite directions, which would be the case were it not prevented by the use of the idler balls. The idler balls also act as friction drivers to the load-carrying balls, thereby tending to insure a positive revolution of the load-carrying balls, and preventing the load-carrying balls from sliding in the bearing and becoming flat-sided as they will when allowed to crowd each other in heavy loaded bearings.

My present ball-retainer may be spun up out of sheet metal, and finished at a very slight cost, and is very light and durable.

It is obvious that to manufacture a ball bearing, to use my present ball-retainer, certain rules of construction must be adhered to. The diameter of the cone 1, measured from the bottom of the groove 2, must be made to correspond to the number and diameter of the balls, so that when assembled the bearing will conform to the requirements herein set forth. The bearing must be constructed so that when the idler ball is in its place within the ball-retainer and between the load-carrying balls, it will be an easy running fit. When the bearing is at rest the uppermost idler balls 21 will rest in the groove 2 of the cone 1 and the undermost idler balls 21 will rest in the groove of the projections 18 of the ball-retainer 17. When the bearing is in operation the idler balls 21 are acted upon by centrifugal force and are constantly thrown out against the grooves in the projections 18 and receive no support within the groove 2 in the cone 1 while the bearing continues in operation. It is obvious that my present ball-retainer provides no internal support for the idler balls, but provides only lateral and external support for such idler balls, whereby their outward and lateral movements are limited.

It will be seen that in the present invention, cups 3 and 4 are supported entirely by the adjacent beveled portions of the housing and locking ring, and in this way the cups are not only alined with relation to each other, but they are adapted to compensate for the slightest variations of the alinement of the axes of the cone and housing. The alining feature of the cups is due to the narrow surface of the beveled parts as compared with the proportionately large diameter of the cups.

Slight variations in the threaded portions of the housing or adjustable ring are compensated for by the yielding feature of the latter, for when the proper adjustment is obtained the tapered screw is screwed into the adjustable ring and thereby expands the ring into the threaded portion of the housing with such force that it is impossible to move the adjustable ring, and the adjustment of the bearing becomes fixed against possible accidental displacement or disturbance. The cups 3 and 4 may be made as duplicates, so that either one may be used as a stationary cup or an adjustable cup, and this interchangeability of the cups simplifies the method of their production, and overcomes the possibility of getting the cups misplaced in assembling the bearing. The cone and cups may be made of high grade steel, and hardened and tempered to insure both strength and great wearing qualities, after which they are ground to the required proportions.

The bearing is assembled by laying down the housing 5 with its screwthreaded portion uppermost, and then the cup 3 is dropped into the housing; the cone is then placed within the housing; and the ball retainer is also placed within the housing and around the cone, a load-carrying ball being placed in one of the openings in the retainer and then an idler ball next to it, and then a load-carrying ball, and so on successively until the circuit of balls is complete; then the cup 4 is placed in the housing next to the balls, and the adjustable locking ring 10 is then screwed into the housing and down against the uppermost or adjustable cup until the bearing is properly adjusted, and then this locking ring is fixed in the given adjustment by operation of the expanding screw 15. The idler balls when in position act as separators between the load-carrying balls and prevent cross friction.

It is to be understood that the invention is not limited to the details of construction shown and described, and that structural variations within the spirit of the invention are contemplated.

What I claim is:—

1. In a ball-bearing, a ball-retainer comprising a continuous unbroken ring adapted to receive load-carrying balls and idler balls, said retainer adapted to limit only the outward and lateral movements of the idler balls.

2. In a ball-bearing, having an uninterrupted ball-race, and load-carrying balls and idler balls within said ball-race, and a continuous unbroken ball-retainer adapted to limit only the outward and lateral movements of the idler balls to maintain the idler balls between the load-carrying balls to prevent cross-friction of the load-carrying balls.

3. In a ball-bearing, having load-carrying balls and idler balls, and a grooved cone, a ball-retainer adapted when in combination with said grooved cone to maintain the axis of the idler balls at or near a line passing through the center of the adjacent load-carrying balls, said retainer adapted to arrest the outward movement of said idler balls when acted upon by centrifugal force, and to allow them to rest on said cone when the bearing is at rest.

4. In a ball-bearing, having load-carrying balls and idler balls, and a grooved cone, a ball-retainer, said retainer adapted in combination with said grooved cone to form a cage to limit the radial movement of said idler balls and to receive and maintain the said load-carrying balls and idler balls, as described, with their axes in alinement with each other.

5. In a ball-bearing, having a ball-race composed of cups, a grooved cone, load-carrying balls and alternating idler balls, and a ball-retainer adapted to receive and maintain the load-carrying balls and idler balls in axial alinement with each other, as described, and the said ball-retainer maintained in axial alinement with the ball-race by means of the idler balls.

In testimony whereof I have hereunto set my hand this twenty-third day of November A. D. 1915.

CHARLES H. CHAPMAN.

Witnesses:
 ALICE E. CHAPMAN,
 MINERVA E. CHAPMAN.